Figure 1:
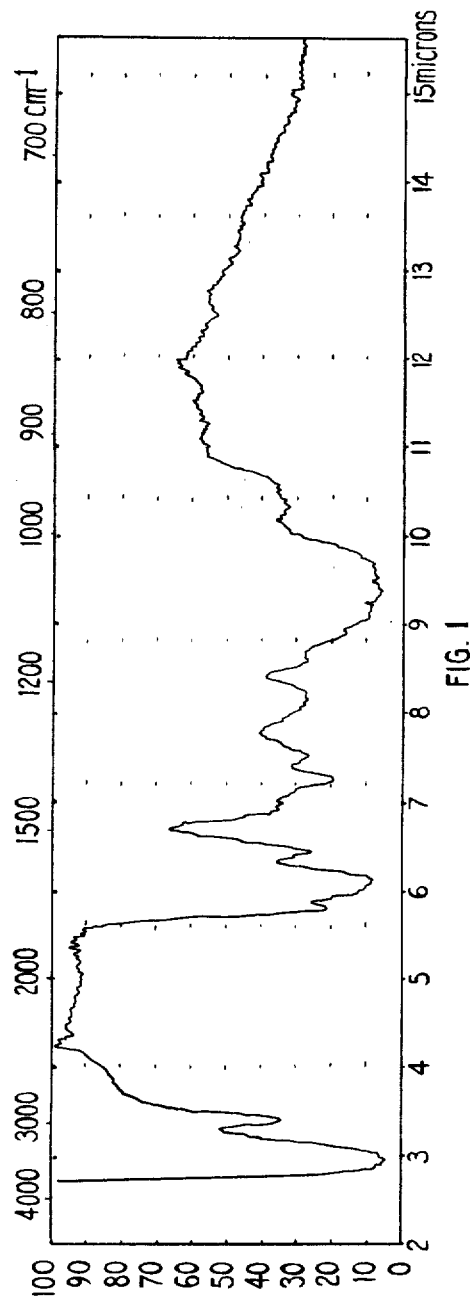

United States Patent
Mancy et al.

[15] 3,686,396
[45] Aug. 22, 1972

[54] THE ANTIBIOTIC 11837 R.P. AND PROCESS FOR ITS MANUFACTURE USING STREPTOMYCES VIRIDANS

[72] Inventors: Denise Mancy, Charenton; Leon Ninet; Jean Preud'Homme, both of Paris, all of France

[73] Assignee: Rhone-Poulenc S.A., Paris, France

[22] Filed: Sept. 16, 1964

[21] Appl. No.: 399,129

[30] Foreign Application Priority Data

Sept. 19, 1963 France....................63948030
Nov. 22, 1963 France....................63954708

[52] U.S. Cl..................................................424/118
[51] Int. Cl. ..............................................A61k 21/00

[58] Field of Search....................167/65 AB; 424/118

[56] References Cited

UNITED STATES PATENTS 3,086,912   4/1963   Bergy et al....................167/65

*Primary Examiner*—Albert T. Meyers
*Assistant Examiner*—Daren M. Stephens
*Attorney*—Stevens, Davis, Miller & Mosher

[57] ABSTRACT

The invention provides the new antibiotic 11837 R.P., which is useful in treating infections caused by Gram-positive microorganisms, and its production by fermentation using the newly discovered microorganism *Streptomyces viridans*(NRRL) 3087).

18 Claims, 2 Drawing Figures

Denise Mancy
Leon Ninet
Jean Preud'Homme
Inventor

THE ANTIBIOTIC 11837 R.P. AND PROCESS FOR ITS MANUFACTURE USING STREPTOMYCES VIRIDANS

THIS INVENTION relates to antibiotics and their manufacture.

The invention provides a new antibiotic, hereinafter referred to as 11,837 R.P., and a process for its manufacture. This new antibiotic is of special value because of its considerable antibacterial activity towards Gram-positive microorganisms and the very long period for which it remains active. It is obtained from culture media of the microorganism which is characterized in detail below, belonging to the streptomyces genus and designated as Streptomyces viridans DS 9466 (NRRL 3087).

11,837 R.P. is very readily soluble in water, soluble in methanol, pyridine, acetic acid and dimethylformamide, and sparingly soluble or insoluble in ethanol, acetone, chloroform and n-hexane. An aqueous solution of 11,837 R.P. is very stable at pH 5 to 10 (keeping at least 90 percent of its activity for a fortnight at 37°C.), moderately stable at pH 4 (losing 30 percent of its activity within a fortnight at 37°C.) and relatively unstable at pH 2 (losing 70 percent of its activity within 6 days at 37°C.).

11,837 R.P. gives negative test results in the following reactions: biuret, ferric chloride, and ninhydrin; and positive test results in the following reactions: ninhydrin after acid hydrolysis, diazotization, xanthoprotein, ammoniacal silver nitrate solution (doubtful before hydrolysis, very strong after acid hydrolysis), phloroglucinol, carbazole, potassium permanganate, and with Benedict's reagent after acid hydrolysis. It turns concentrated sulphuric acid orange and concentrated hydrochloric acid pale pink.

11,837 R.P. is a strong acid whose neutralization equivalent, measured by potentiometric titration with sodium hydroxide, is 600 (pKa = 4.1). Its molecular weight appears to be greater than 5,000 because it does not dialyze through a diaphragm of regenerated cellulose (of the "Cellophane" type).

11,837 R.P. contains carbon, hydrogen, oxygen, nitrogen and phosphorus. Its elementary composition (as revealed by the analysis of its sodium salt) is approximately: C = 46.9%, H = 7.9%, O = 39.2%, N = 3.9%, and P = 2.25%. It has the following physical properties. It is a white, amorphous powder, of no definite melting point, but decomposing above 160°C. Its infra-red spectrum (measured on a tablet of a mixture with KBr) is shown in FIG. 1 of the accompanying drawings, where the upper scale on the abscissa is the wavelength in microns and the lower scale the wave number in cm.$^{-1}$, and the transmission in % is shown on the ordinate. The principal infra-red absorption bands of 11,837 R.P. are as follows:

| | | |
|---|---|---|
| 3360 vs | 1164 m | |
| 2930 s | 1125 sh | |
| 1720 s | 1100 m | where |
| 1630 vs | 1068 vs | vs = very strong |
| 1564 m | 1040 vs | s = strong |
| 1550 s | 968 m | m = medium |
| 1430 sh | 950 m | w = weak |
| 1400 sh | 890 w | sh = shoulder |
| 1380 s | 860 w | |
| 1330 m | 800 w | |
| 1222 s | | |

Figure 2:
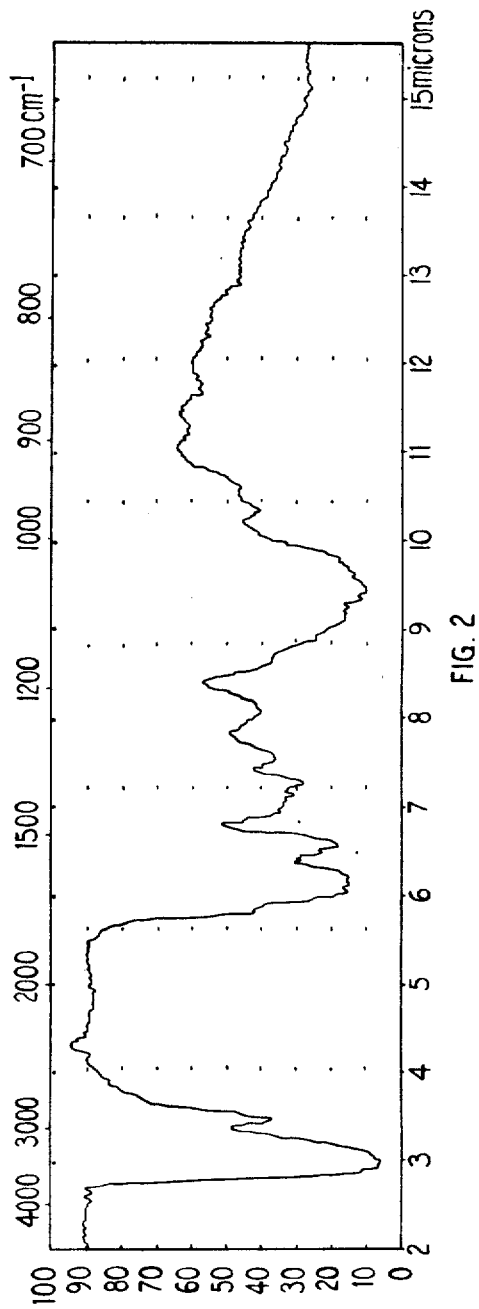

The salts, especially the alkali metal salts, of 11,837 R.P. with bases are within the scope of the invention. The sodium salt of 11,837 R.P. has the elementary composition: O = 45.0%, H = 7.4%, O = 37.6%, N = 3.72%, P = 2.16% and Na = 4.15%. It has the following physical properties. It is an almost white, amorphous powder, having an optical rotation of $[\alpha]_D^{22} = +6°\pm 1°$ ($c$ = 0.6, water). Its ultraviolet spectrum (measured in a solution of 30 mg. per liter of water; i.e., 0.003 percent) shows end absorption: 220 m$\mu$ ($E_1^{1\%}{}_{cm.}$ = 30) and 257 m$\mu$ ($E_1^{1\%}{}_{cm.}$ = 3.5). Its infra-red spectrum (measured on a tablet of a mixture with KBr) is shown in FIG. 2, where the lower scale on the abscissa is the wavelength in microns and the upper scale shows the wave numbers in cm.$^{-1}$, and the transmission in percent is shown on the ordinate. The principal infrared absorption bands of this salt are as follows:

| | | |
|---|---|---|
| 3400 vs | 1160 m | |
| 2910 s | 1100 m | |
| 1730 vs | 1062 vs | where |
| 1547 m | 1042 sh | vs = very strong |
| 1525 s | 1030 sh | s = strong |
| about 1430 sh | 972 m | m = medium |
| 1378 s | 947 m | w = weak |
| 1330 m | 890 w | sh = shoulder |
| 1238 m | 860 w | |

The bacteriostatic activity of 11,837 R.P. towards a number of microorganisms has been determined by a conventional dilution method. For every microorganism the minimum concentration of antibiotic was measured at which under defined conditions all visible development of the microorganism on a suitable nutrient broth was inhibited. The results of the various measurements are summarized in Table I where the minimum bacteriostatic concentrations of the new antibiotic are shown in micrograms of substance per cc. of test nutrient medium.

These different measurements show that the bacteriostatic activity of 11,837 R.P. is directed principally towards microorganisms which accept Gram staining, its activity against Streptococcus hemolyticus being particularly strong. It is relatively inactive against Gram-negative microorganisms though its activity against Neisseria catarrhalis, Neisseria gonorrhaeae and Brucella abortus bovis is appreciable. No cross-resistance is noticeable with the following antibiotics: penicillin, streptomycin, tetracycline, chloramphenicol, spiramycin, carbomycin, erythromycin, pristinamycin and novobiocin. The results of various measurements of bacteriostatic concentrations of 11,837 R.P. against different strains of Staphylococcus that are resistant to one or several of the above-mentioned antibiotics, are summarized in Table II where there are shown for purposes of comparison the bacteriostatic concentrations for three strains of Staphylococcus sensitive towards all these antibiotics (also listed in Table I).

TABLE I

| Bacterial organisms tested | Minimum bacteriostatic concentration in $\mu$g./cc. |
|---|---|
| Staphylococcus aureus, strain 209 P-ATCC 6538 P | 0.15 |
| Staphylococcus aureus, strain 133 (Institut Pasteur) | 0.15 |
| Staphylococcus aureus, strain Smith | 0.35 |
| Sarcina lutea — ATCC 9341 | 150 |
| Streptococcus faecalis — ATCC 9790 | 50 |

| | |
|---|---|
| *Streptococcus viridans* (Institut Pasteur) | 0.6 |
| *Streptococcus pyogenes hemolyticus* (strain Dig 7, Institut Pasteur) | 0.005 |
| *Neisseria gonorrhaeae* (A 50 — Institut Pasteur) | 1.25 |
| *Diplococcus pneumoniae* (strain Til, Institut Pasteur) | 0.03 |
| *Bacillus subtilis* — ATCC 6633 | 3 |
| *Bacillus cereus* — ATCC 6630 | 0.03 |
| *Mycobacterium species* — ATCC 607 | 35 |
| *Mycobacterium para-smegmatis* (A 75 - Lausanne) | 65 |
| *Escherichia coli* — ATCC 9637 | 35 |
| *Shigella dysenteriae* Shiga L (Institut Pasteur) | 40 |
| *Salmonella paratyphi* A (Lacasse, Institut Pasteur) | 55 |
| *Salmonella schottmuelleri* (*parathyphi* B) Fougenc (Institut Pasteur) | 30 |
| *Proteus vulgaris* - A 244 | 165 |
| *Klebsiella pneumoniae* - ATCC 10,031 | 60 |
| *Pseudomonas aeruginosa* (strain Bass - Institut Pasteur) | 40 |
| *Brucella bronchiseptica* (CN-387 - Wellcome Institute) | 9 |
| *Brucella abortus bovis* B 19 | 2.5 |
| *Pasteurella multocida* (A 125, Institut Pasteur) | 1.5 |
| *Treponema* Reiter | 20 |

TABLE II

| Strain of *Staphylococcus aureus* tested | Minimum bacteriostatic concentration in µg./cc. |
|---|---|
| Strain 209 P-ATCC 6538 P (s) | 0.15 |
| Strain 209 P, rendered resistant to spiramycin | 0.2 |
| Strain 209 P, rendered resistant to carbomycin | 0.15 |
| Strain 209 P, rendered resistant to pristinamycin | 0.25 |
| Strain 209 P, rendered resistant to novobiocin | 0.1 |
| Strain 133 (Institut Pasteur) (s) | 0.15 |
| Strain Smith (s) | 0.35 |
| Strain B₃ (resistant to penicillin and streptomycin) | 0.2 |
| Strain Hb (resistant to penicillin and tetracycline) | 0.3 |
| Strain Beaujon 3 (resistant to penicillin, streptomycine, tetracycline and chloramphenicol) | 0.3 |
| Strain MB I (resistant to penicillin and erythromycin) | 0.1 |
| Strain Lavault (resistant to penicillin, erythromycin and spiramycin) | 0.1 |

The antibacterial activity of 11,837 R.P. has been shown in in vivo tests on laboratory animals infected with microorganisms such as Streptococci, Pneumococci, Staphylococci and Neisseriae (*Neisseria meningitidis*). It is particularly potent in the mouse on parenteral administration, the activity by the intravenous route being twice that of administration by the subcutaneous route.

It has a very prolonged activity which makes it a very good prophylactic agent. This prophylactic activity has been demonstrated towards staphylococcal and streptococcal infections of the mouse. Thus, for example, a single dose of 250 mg./kg. of 11,837 R.P. given intravenously protects all mice from intraperitoneal infection by Streptococci for 56 days after administration of the antibiotic. The same dose (250 mg./kg.) introduced by the subcutaneous route of benzathine penicillin G protects the mouse only for 24 hours.

The toxicity of 11,837 R.P. has been studied in the mouse. The 50 percent lethal dose ($LD_{50}$) has been determined both for subcutaneous and intravenous administration:

$LD_{50} = 1.7$ g./kg. (subcutaneous)

1.5 g./kg. (intravenous).

As these values show, the antibiotic is of very low toxicity.

The microorganism that produces the antibiotic 11,837 R.P. belongs to the genus Streptomyces and is called *Streptomyces viridans* DS 9466. It has been deposited at the laboratory of the NRRL at Peoria, Ill., United States of America under reference number NRRL 3087.

This organism was isolated from a soil specimen, collected near Madras, India, in the following manner. The soil specimen was suspended in sterile distilled water and this suspension was then diluted to different concentrations. A small volume of each dilution was placed in Petri dishes each containing an agar nutrient medium. After several days' incubation at 26°C. the colonies of microorganisms to be isolated were pricked out onto agar slopes to obtain more abundant cultures.

According to the classification in Bergey's Manual of Determinative Bacteriology (7th Edition [1957] The Williams & Wilkins Company, Baltimore) for the genus Streptomyces and the classification and descriptions given by S. A. Waksman in "The Actinomycetes" (The Williams & Wilkins Company, Baltimore [1961]) it is found that the morphological characteristics of the organism that produces 11,837 R.P. correspond to those described for *Streptomyces viridans*. Therefore the organism which produces 11,837 R.P. has been grouped with this species and called *Streptomyces viridans* DS 9466.

Table III lists the characteristics of the strain *Streptomyces viridans* DS 9466 side by side with the description of the species *Streptomyces viridans* in Bergey's Manual of Determinative Bacteriology. This comparison shows clearly that the organism which produces 11,837 R.P. displays characteristics corresponding to those described for *Streptomyces viridans*. The minor differences shown can be attributed only to different strains of the same species.

*Streptomyces viridans* DS 9466 is capable of producing on certain culture media, particularly Bennett's medium, a soluble green pigment which, at the start of this product and when a sufficient quantity thereof has been produced, displays an intense emerald green color. This product of an emerald green pigment is rather capricious and depends mainly on the intensity of the seeding of the microorganism on the medium where it is produced; the presence of soil favors it; the emerald green color of the substrate does not persist and, as the culture ages, its color changes according to the culture medium and the quantity in which it is produced, to blackish green or brownish green or greyish brown.

TABLE III

| | *Streptomyces viridans* Bergey's Manual of Determinative Bacteriology, 7th Edition pages 758-759 | *Streptomyces viridans* DS 9466 |
|---|---|---|
| Vegetative growth | Colonies green to greenish brown | Vegetative mycelium greyish yellow to vivid yellow or brownish yellow. On certain media it takes a green color turning to greenish brown |

| | | or blackish green in the zones where soluble green pigment is produced. |
|---|---|---|
| Aerial mycelium | Deep grey tinged with olive or green-grey, velvety, covering the whole colony. Long sporophores forming spirals. Cylindrical spores. | Light grey to dark grey, powdery, well developed. Long sporophores, monopodial, ending in spore chains inserted in terminal bunches; susceptible of branching along their main stem. Spore chains flexuous or forming short spirals. Cylindrical spores. |
| Gelatin Agar | Rapid liquefaction. growth brown-green soluble brown pigment is produced | Moderate liquefaction. Vegetative growth yellow or brownish to green-brown, according to medium used. Soluble pigment nil or brownish; in addition in certain cases facultative and more or less regular production of a soluble green pigment. |
| Synthetic agar | Green colonies. Production of soluble green pigment. | Vegetative mycelium yellowish or brownish, turning green when soluble green pigment is produced. Soluble pigment nil or yellowish to brownish, mostly of low intensity. In certain cases limited production of soluble green pigment (glycerin —asparagine agar, Waksman's starch agar) or more abundantly (Czapek's glycerin agar; in the latter case, the presence of soil has proved favorable. |
| Milk | Coagulated and quickly peptonized. | Slow peptonisation, without prior coagulation at 25°, with slight coagulation at 37°. |
| Sucrose | Rapid inversion | Poor utilisation. |
| Starch | Rapid hydrolysis. | Hydrolysis fairly rapid. |
| Cellulose | Poor growth. | Positive growth. |
| Nitrites | Active production from nitrates | Rapid and massive production from nitrates. |
| Antagonistic properties | Nil | Production of 11,837 R.P. |

*Streptomyces viridans* DS 9466 displays a sporulated aerial system of rather dark grey color, which develops well on a number of conventional culture media, especially on Bennett's medium. It forms cylindrical spores of 0.7 to 0.9$\mu$ width and 1.3 to 1.5$\mu$ length. These sporophores are monopodially inserted; very frequently they form a branched system of complicated organization. Certain sporiferous filaments carry a single chain of spores, but often the aerial filament ends in a bunch of several sporiferous filaments, generally two to four, inserted at the same point at its extremity. One or several filaments inserted at the extremity of the main filament may in turn split at their terminal points and themselves form new groups of two to four spore chains. Along the main and secondary filaments branching is often observed, formed either by a sporiferous single filament ending in a single spore chain, or by a single filament ending in several spore chains inserted at its terminal point, or sometimes by two or three sporiferous filaments inserted at the same point with or without terminal branches. The spore chains are flexuous and have simple terminal hooks, or they curl up and form 1-coil or 2-coil, generally open, spirals.

The culture characteristics and the biochemical properties of *Streptomyces viridans* DS 9466 have been examined on nutrient agars and the nutrient broths generally used for examining Streptomyces strains. The collected results are shown in Table IV; unless otherwise indicated, they refer to cultures grown for two to four weeks at 26°C., when a good state of development had been reached. Most of the culture media employed were prepared as directed in "The Actinomycetes", S. A. Waksman, pages 193–197, Chronica Botanica Company, Waltham, Mass., United States of America, 1950; where this applies, there will be found the letter W followed by the number accorded to them in "The Actinomycetes".

The references or compositions of the other culture media are as follows:

Ref. A —K. L. Jones - Journal of Bacteriology 57, p. 142 [1949].

Ref. B —A. M. Williams and E. McCoy - Applied Microbiology I, p. 307 [1953].

Ref. C —Grundy et al. —Antibiotics and Chem. 2, p. 401 [1952].

Ref. D —0.5 percent peptone + 0.3 percent meat extract +0.5 percent tyrosine =2 percent agar.

Ref. E — Inorganic salts — starch agar — T. G. Pridham et al, Antibiotics Annual, 1956–1957, pp. 947–953.

Ref. F — corresponding to formula W-1, except that 30 g. of sucrose are replaced by 15 g. of glycerin.

Ref. G - "Plain gelatin", prepared as directed in "-Manual of Methods for Pure Culture Study of Bacteria" of the Society of American Bacteriologists, Geneva, N.Y., - 11$_{50}$ - 18.

Ref. H — Manual of Methods of Pure Culture Study of Bacteria — Society of American Bacteriologists, Geneva, N.Y., 11$_{50}$ - 18.

Ref. I — Manual of Methods of Pure Culture Study of Bacteria — Society of American Bacteriologists, Geneva, N.Y., 11$_{50}$ - 19.

Ref. J — corresponds to formula W-18, except that the sucrose is omitted and replaced by small strips of filter paper dipped partially in the liquid.

Ref. K — Commercial skimmed milk powder, reconstituted as instructed by the manufacturers.

Ref. L — H. D. Tresner and F. Danga — Journal of Bacteriology 76, pp. 239–244 [1958].

TABLE IV

| Culture medium | Degree of development | Vegetative mycelium or underside of culture | Aerial system (including total of aerial mycelium and sporulation) | Soluble pigment | Remarks and biochemical properties |
|---|---|---|---|---|---|
| Bennett's agar (Ref. A) | Good | Underside greyish yellow, turning to greenish brown in spots where soluble green pigment is formed. | Light greyish to dark grey. Well developed. | Green, when ageing turning greenish grey to very dark green-brown, and blackish, depending on quantity developed. | Production of soluble green pigment is promoted when soil present. |
| Maltose-tryptone agar (Ref. B). | do | Underside greyish yellow brown. | Whitish to grey | Slight brownish grey | |
| Emerson's agar (W-23) | Medium | Light yellowish brown. Well developed. | Whitish, in traces | Nil | |
| Glucose-peptone agar (W-7) | do | Light-yellow. Rather well developed. | Whitish. Very moderate | Slight yellowish | |
| Nutrient agar (W-5) | Poor | Light greyish yellow. Moderate development. | Nil | Nil | |

TABLE IV

| Culture medium | Degree of development | Vegetative mycelium or underside of culture | Aerial system (including total of aerial mycelium and sporulation) | Soluble pigment | Remarks and biochemical properties |
|---|---|---|---|---|---|
| Glucose-asparagine agar (W-2). | Medium | Vivid yellow to brownish yellow. | After fortnight nil. After 1 month small (whitish to greyish) in older cultures. | After fortnight nil. After 1 month small quantity, greyish to greenish grey. | |
| Glycerine-asparagine agar (W-3). | Moderate | Brownish yellow with irregular trace of greenish. | Greyish white to light greyish. Very moderate development. | Slight brownish grey with irregular small quantity of greenish to greenish grey. | |
| Krainsky's calcium malate agar (Ref. C). | Good | Underside light greyish yellow. | Whitish to light grey. | Nil, or slowly formed, slight greyish. | Calcium malate is solubilized. |
| Tyrosine agar (Ref. D) | do | Underside yellowish brown. | Whitish. Moderately developed. | Yellow-brown. | Tyrosine well solubilised. |
| Starch agar (W-11). | Moderate | Underside greenish grey to dark greenish brown. | Whitish to grey. Moderately developed. | Greyish green to greenish grey. | |
| Pridham's starch agar (Ref. E). | Good | Underside light greyish yellow. | Light grey. Fairly well developed. | Nil. | Medium hydrolysis of starch. |
| Czapek's synthetic glycerine agar (Ref. F). | do | Underside light brownish yellow to yellowish brown. Turning to dark greenish brown at the site where soluble green pigment is produced. | Whitish to grey. | Light brownish yellow to light yellowish brown. When soil is added soluble green pigment is produced which on ageing turns greyish brown to very dark greenish brown, almost blackish. | The presence of soil has considerable influence on this medium insofar as production of soluble green pigment is concerned. |
| Potato culture (W-27). | Fairly good. | Veget. mycelium greenish yellow brown to very dark green, turning blackish brown on ageing. | Whitish to light grey. Moderate development. | Production is more or less delayed. Abundant. Very dark green, turning greenish black, diffusing into the whole of the potato. | |
| Pure gelatin 12% (Ref. G). | Medium | Surface culture limited to the site of the point of inoculation. Underside yellow. | Whitish to greyish. Moderate development. | Delayed production. After fortnight nil. After 1 month light yellowish. | Liquefaction of gelatin positive but rather slow, incomplete after 1 month. |
| Nitrate nutrient broth (Ref. H). | Good | Whitish ring on surface. | Very limited development. Whitish. | Nil. | Strong positive nitrite reaction. |
| Dimmick's glucose nitrite broth (Ref. I). | Moderate | Light ring and veil very moderately developed on surface. Greyish white to light yellowish. | Nil or whitish, in traces. | Very faint yellow. | Strong positive nitrite reaction. |
| Czapek's synthetic cellulose broth (Ref. J). | Fairly good. | | Grey. Well developed in whole of paper protruding above broth. | Nil. | Strong positive nitrite reaction. |
| Skimmed milk (Ref. K) (a) at 26°. | Good | Ring well developed. Very faintly yellowish. | Nil to slight traces, whitish. | | No change in appearance of milk after fortnight. Then slow peptonisation, almost complete after 1 month's cultivation. No coagulation. pH goes from 6.3 to 7.2-7.4 within 1 month. |
| Skimmed milk (b) at 37°. | Fairly good. | Ring development moderate. Light yellow to light yellowish brown. | Nil to faint traces, whitish. | | No change in appearance of milk after fortnight. At end of 3 to 4 weeks slight coagulation with beginning peptonisation. pH goes in 1 month from 6.3 to 5.9-6.1. |
| Tresner and Danga medium (Ref. L). | | | | | Production of $H_2S$ negative. |

According to the method of Pridham and Gottlieb (J. Bacteriol. 56, pp. 107–114 [1948]) *Streptomyces viridans* DS 9466 readily utilizes the following as carbon sources: xylose, arabinose, rhamnose, glucose, galactose, levulose, mannose, lactose, maltose, trehalose, cellobiose, dextrin, starch, inulin, erythritol, adonitol, dulcitol and sorbitol; utilization of sucrose is weak and slow, almost nil within 10 days and allows only a poor development within one month.

According to a feature of the invention, the antibiotic herein designated 11,837 R.P. is produced by aerobically cultivating *Streptomyces viridans* DS 9466 (NRRL 3087) or a 11,837 R.P.-producing mutant thereof on an aqueous nutrient medium containing assimilable sources of carbon, nitrogen and inorganic substances, and separating the 11,837 R.P. formed during its cultivation.

*Streptomyces viridans* DS, 9466 can be grown by any of the known surface or submerged aerobic culture methods, the latter procedure being preferred because it is more convenient. For this purpose conventional apparatus may be used. In particular, the following sequence of operations may be adopted:

*Streptomyces viridans* DS 9466 – stock
↓
culture on agar
↓
culture in an agitated flask
↓
inoculum culture in fermentation vessels
↓
production culture in fermentation vessels.

The fermentation medium must contain assimilable sources of carbon, nitrogen, inorganic substances, and possibly growth-promoting factors. All these ingredients may be used as well defined products or complex mixtures, such as are found in natural biological products of various origins.

As the sources of assimilable carbon there may be used carbohydrates such as glucose or lactose, dextrins, starches, and molasses, and other carbon-, hydrogen- and oxygen-containing substances such as sugar alcohols, e.g. mannitol, or certain organic acids, such as lactic, citric, or tartaric acid. Certain animal or vegetable oils such as lard oil or soybean oil may be advantageously used instead of or in admixture with carbon-, hydrogen- and oxygen-containing substances.

A very wide range of suitable sources of assimilable nitrogen is available. The source may be very simple chemical compounds such as nitrates, mineral or organic ammonium salts, urea or aminoacids. It may also be in the form of a complex substance containing a proportion of nitrogen, principally in the form of protein, e.g. casein, lactalbumin, and gluten and their hydrolysates, soybean flour, peanut meal, fish meal, meat extracts, yeast extracts, distillers' solubles, and cornsteep liquor.

Of the inorganic substances added some may have a buffering or neutralizing effect, such as the alkali metal phosphates or alkaline earth metal phosphates, or the carbonates of calcium and magnesium. Others contribute to the ionic equilibrium needed for the development of *Streptomyces viridans* DS 9466 and the formation of the antibiotic; examples of these are the chlorides and sulphates of the alkali and alkaline earth metals. Finally, some act more especially as activators of the metabolism of *Streptomyces viridans* DS 9466; to these belong the salts of zinc, cobalt, iron, copper, and manganese.

The pH of the fermentation medium at the start of the culture should be within the range from 6.0 to 7.8, preferably from 6.5 to 7.5. The optimum fermentation temperature is 25°–28°C., but satisfactory production is obtained at temperatures from 23° to 35°C. The rate of aeration of the fermentation vessels may vary within rather wide limits, but it has been observed that a particularly advantageous rate is 0.3 to 2 liters of air per liter of medium per minute. The maximum yield of antibiotic is achieved after 4 to 7 days' growth, but this period depends predominantly on the individual medium used.

From the foregoing it will be realized that the general conditions of the culture of *Streptomyces viridans* DS 9466 for the production of the antibiotic 11,837 R.P. may be widely varied and adapted as appropriate to the circumstances.

11,837 R.P. can be isolated from the fermentation media by a variety of methods. In one such method the fermentation medium is filtered at a pH of 7 or more, but under these conditions part of the activity remains in the filter cake and part in the filtrate and both must be treated to extract the active principle. It is therefore preferable to perform the filtration at a pH BELOW %, preferably at about pH 3; under these conditions the whole of the activity remains in the filter cake from which it can be extracted at a pH from 3 to 7 by water containing a lower alcohol such as methanol, ethanol or propanol, or with a mixture of lower aliphatic alcohols containing at most six carbon atoms, the most useful mixture containing n-butanol + methanol at the ration of 2:1 to 3:1 by volume. It is also possible to percolate the fermentation medium through a column containing a strongly basic anion exchange resin, followed by an elution with an aqueous alcoholic solvent, such as aqueous methanol, containing an electrolyte.

The crude product can be isolated from its alcoholic or aqueous alcoholic solution mentioned above by concentration of the solution to a small volume, and this concentration is advantageously performed at a temperature below 40°C. and under reduced pressure. By cooling and/or addition of a substance which is a poor solvent for 11,837 R.P., such as a ketone, an ether, an ester, a chlorinated solvent, benzene or hexane, the crude antibiotic is caused to precipitate. When the antibiotic is contained in the filtrate from the culture media, the solution is extracted with a water-immiscible solvent such as an aliphatic alcohol containing four or five carbon atoms.

This is followed by concentration to a small volume and precipitation as described above.

The antibiotic 11,837 R.P. can then be purified by fixing it on a strongly basic anion exchange resin, followed by elution with an aqueous alcoholic solution containing an electrolyte, such as hydrochloric acid or a chloride of sodium, ammonium, potassium, calcium, or magnesium, added in an amount of 5 to 50 g. per liter of eluant. The eluate can then be concentrated to a small volume at a temperature below 40°C. under reduced pressure, the concentrate then being dialyzed against a current of distilled water, using a diaphragm of regenerated cellulose. The mineral salts and other low molecular weight impurities are carried away by the water and 11,837 R.P. remains quantitatively in the dialyzed solution. The latter is then subjected to azeotropic concentration to a very small volume under reduced pressure after butanol has been added to it. The purified antibiotic is precipitated from the aqueous concentrate with a mixture of solvents such as acetone + isopropanol, if desired with addition of diethyl ether or diisopropyl ether in a ratio such that no separation of phases occurs on mixing with the aqueous phase. A preferred mixture contains acetone and isopropanol in the volumetric ratio of 4:1 or acetone + isopropanol + ether in the volumetric ratio of 1:1:1.

The antibiotic may then be subjected to a further purification by agitating an aqueous solution of 11,837 R.P. with a strongly acidic cation-exchange resin until a constant pH of from 2 to 3 is reached. The effluent is then washed with a water-immiscible solvent, such as an aliphatic alcohol containing four to five carbon atoms, or an ester such as ethyl acetate, or a mixture of such solvents. The operation is preferably performed with a mixture of equal volumes of n-butanol and ethyl acetate. The aqueous phase is concentrated to one hundredth of its initial volume, whereupon butanol is added and the whole is concentrated under reduced pressure while further butanol is continuously added. Purified 11,837 R.P. is obtained by adding a substance that is a poor solvent for 11,837 R.P., such as hexane, centrifuging, and washing and drying the precipitate.

It will be understood that the different methods referred to above can be applied in any desired order or repeated several times as required for the manufacture of 11,837 R.P. in a form suitable for the application envisaged.

The following non-limitative Examples illustrate the invention. In the following the activity is measured biologically by the diffusion method using *Bacillus subtilis* as the sensitive microorganism and with reference to a sample of pure 11,837 R.P. as standard. This activity is expressed in units (u) per mg. for the solid products and in units per cc. for the solutions (a "unit" is defined as the minimum amount of 11,837 R.P. which, dissolved in 1 cc. of the appropriate medium, inhibits the growth of *Staphylococcus aureus* 209 P under specified conditions).

EXAMPLE 1

A 170-liter fermentation vessel is charged with

| | |
|---|---|
| Cornsteep | 4.8 kg. |
| glucose hydrate | 2.4 kg. |
| sodium chloride | 0.6 kg. |
| magnesium sulphate | 0.12 kg. |
| water to make | 100 liters. |

After the pH value of the mixture has been adjusted to 7.15 by adding 575 cc. of concentrated sodium hydroxide solution ($d = 1.33$), 0.6 kg. of calcium carbonate are added.

The nutrient medium is then sterilized by bubbling steam at 122°C. through it for 40 minutes. After cooling, the broth has a volume of 120 liters and a pH of 7.15. The medium is inoculated with 200 cc. of a culture of the strain *Streptomyces viridans* DS 9466 grown in an agitated Erlenmeyer flask, and developed for 28 hours at 26°C. with agitation and aeration with sterile air, whereupon it is ready for inoculation of the production culture.

The production culture is carried out in a 350-liters fermentation vessel charged with the following substances:

| | |
|---|---|
| Soybean flour | 8 kg. |
| distillers' solubles | 1 kg. |
| starch | 3 kg. |
| soybean oil | 3 liters |
| calcium carbonate | 2 kg. |
| sodium chloride | 2 kg. |
| cobalt chloride hexahydrate | 4 g. |
| water to make | 180 liters. |

The medium (pH = 7.05) is sterilized by bubbling steam at 122°C. through it for 40 minutes. After cooling, the broth has a volume of 200 liters and its pH is 7.15. Inoculation is performed with 20 liters of the inoculum culture grown in the 170-liter fermentation vessel described above. Culture is performed at 26° to 27°C. for 138 hours with agitation and aeration with sterile air, whereupon the pH of the medium is 7.90 and the volume is 180 liters. The amount of antibiotic present in the medium is 4515 u/cc.

EXAMPLE 2

The inoculum culture is grown in a 170-liter fermentation vessel under the conditions described in Example 1. The production culture is carried out in a fermentation vessel of 350 liters capacity, charged with the following substances:

| | |
|---|---|
| Cornsteep | 6 kg. |
| starch | 2 kg. |
| soybean oil | 3 liters |
| cobalt chloride hexahydrate | 4 g. |
| water to make | 175 liters. |

After the pH of the mixture has been adjusted to 5.90 with 380 cc. of concentrated sodium hydroxide solution ($d = 1.33$), 1 kg. of calcium carbonate is added.

The mixture is sterilized by bubbling steam through it at 122°C. for 40 minutes. After cooling, there are finally added to the culture medium under sterile conditions 0.4 kg. of ammonium sulphate in solution in 5 liters of water.

The broth then has a volume of 200 liters and its pH is 6.80. Inoculation is carried out with 20 liters of inoculum culture from the 170-liter fermentation vessel. The culture is continued at 26°C. to 27°C. for 144 hours with agitation and aeration with sterile air. The final pH of the culture is 8.40 and the volume of the fermentation broth 185 liters. The amount of antibiotic then present in the medium is 3550 u/cc.

EXAMPLE 3

Two hundred liters of fermentation medium, containing 2,855 u/cc. at pH 8.4, are adjusted to pH 3 with 5N-hydrochloric acid solution in a vat equipped with an agitator, and 12 kg. of a filtration assistant are added. The mixture is filtered through a filter press and the filter cake is washed with 60 liters of tap water. The filtrate and the washings are practically inactive and are discarded. The filter cake is suspended by agitation in 150 liters of a mixture of butanol (2 volumes) and methanol (1 volume). The apparent pH of the mixture is then adjusted to 6 with a 10N-solution of sodium hydroxide. Agitation is continued for 30 minutes and the mixture is then filtered through a filter press.

The filtrate is collected and the filter cake washed with 30 liters of the above-mentioned mixture of butanol and methanol. The total of filtrate and washings (185 liters) contains 2075 u/cc. The filter cake is discarded. The alcoholic filtrate is concentrated under reduced pressure (20 mm. Hg) at 35°C. to a volume of 2 liters.

The antibiotic which precipitates during the concentration is filtered off, washed with acetone and dried in an oven under a vacuum of 5 mm.Hg. There are thus obtained 254 g. of a greenish grey product containing 1025 u/mg.

EXAMPLE 4

Three hundred and seventy five liters of culture medium at pH 7.9 are strained to remove the coarsest particles. The pH is adjusted to 7 with 5N-hydrochloric acid in an agitated vat, and 22.5 liters of Dowex 1-X 2resin (Cl-form) are added. Agitation is continued for two hours, and the mixture is then passed through a vibrating sieve. The resin remains on the sieve and the extracted medium is discarded. The resin is then transferred to a column and washed with 50 liters of a 5 percent aqueous solution of sodium chloride and then with 10 liters of water. The washed resin is then dehydrated by passage of 20 liters of methanol, and elution is effected with methanol containing 20 percent water and 2.8 percent of ammonium chloride. The eluates are taken in fractions of 10 liters. The first three eluate fractions contain 98 percent of the eluted activity; they are combined and concentrated to a volume of 3 liters under a pressure of 20 mm.Hg. The concentrated solution contains 92,950 u/cc. and has a specific gravity of 1.057; it is dialyzed for 48 hours against distilled water through a regenerated cellulose diaphragm. After this operation the solution has a volume of 4.7 liters and a specific gravity of 1.025. The solution is concentrated to 300 cc. under a pressure of 5 mm.Hg and then freeze-dried, to yield 48 g. of crude product containing 6530 u/mg.

EXAMPLE 5

Two hundred and fifty g. of the crude antibiotic prepared as described in Example 3 are dissolved in 4 liters of water at pH 8. The aqueous solution is filtered and then poured through a column of 2.7 liters of Dowex 1–X2 ion exchange resin (Cl⁻form), and the effluent is discarded. The resin is washed with 2.5 liters of water and then with 2.5 liters of methanol+water (80:20 by volume). The antibiotic is finally eluted with 10 liters of methanol+water (80:20 by volume) containing 7.5 g. of potassium chloride per liter.

The eluate is concentrated to 400 cc. under reduced pressure (20mm.Hg) at a temperature below 40°C. The concentrate is dialyzed for 24 hours against a current of distilled water through a regenerated cellulose diaphragm to eliminate the mineral salts and low molecular weight organic impurities.

The dialyzed solution (650 cc.) which contains all of the activity of the eluate is concentrated to 125 cc. under a pressure of 20 mm.Hg. The resulting concentrate is mixed with 20 volumes of a mixture of ether +acetone+isopropanol (10:10:10 by volume), and the antibiotic is precipitated. After filtration, washing with acetone and drying overnight at 35°C. under 2 mm.Hg pressure, there are obtained 8.25 g. of a light-brown powder containing 24,600 u/mg.

EXAMPLE 6

7.9 g. of the product of Example 5 are dissolved in 790 cc. of the lower phase separated from a mixture of n-butanol+ethyl acetate+water (10:10:20 by volume) and agitated to a constant pH of 2.1 with 50 cc. of Amberlite IR 120 ion-exchange resin (acid form) added in small portions. The resin is filtered off and the filtrate washed with 2 × 790 cc. of the upper phase of the above mixture. The washings are then extracted with an equal volume of lower phase.

The lower phases are combined and concentrated to 15 cc. under a pressure of 20 mm.Hg. The resulting aqueous concentrate is mixed with 20 volumes of methanol+ether (4:6 by volume). The antibiotic precipitates and yields 3.05 g. of a first crude product containing 18,300 u/mg.

The precipitation mother liquors are concentrated to 100 cc. under a pressure of 20 mm.Hg. There are then added 320 cc. of methanol and 35 cc. of n-butanol. The mixture is concentrated to 15 cc. under 20 mm.Hg pressure at a temperature below 10°C. After adding 15 volumes of n-hexane, centrifugation, washing with hexane and drying overnight at 35°C. under 2 mm.Hg pressure, there are obtained 1.78 g. of purified antibiotic containing 36,000 u/mg.

The combined upper phases are likewise concentrated to about 70 cc. under 20 mm.Hg pressure. By adding 15 volumes of hexane, there are isolated 1.5 g. of a brown powder containing 17,200 u/mg.

EXAMPLE 7

Five hundred forty-two mg. of the antibiotic obtained in Example 6, containing 36,000 u/mg. are dissolved in 20 cc. of water, to give a solution of pH 2.3. The pH is then adjusted to 6.85 by adding 8.9 cc. of 0.1 N-sodium hydroxide solution, and the neutral solution is freeze-dried, to yield 565 mg. of the sodium salt of the antibiotic, whose aqueous solution displays a maximum ultraviolet absorption at $\lambda = 256.5$ m$\mu$ ($E_{1cm}^{1\%} = 106$). Its elementary composition is as follows: C = 47.4%, H = 7.07%, O = 35.3% (by difference), N = 5.01%, P = 1.84%, Na = 3.4%.

EXAMPLE 8

Fifty g. of the antibiotic obtained in Example 5 are dissolved in 500 cc. of distilled water, and the solution is dialysed overnight against 40 liters of distilled water through a regenerated cellulose diaphragm.

After the dialysis, the solution of the antibiotic is mixed with 1 volume of n-propanol and the mixture is introduced into the top of a column charged, in order from the bottom, with 75 g. of granulated carbon "Acticarbone BS 40–80" previously washed with dilute hydrochloric acid, 125 cc. of Amberlite IR 120 (H⁺form), 500 g. of granulated carbon of the same quality as above.

When all of the antibiotic solution has percolated, elution is performed with n-propanol+water (50:50 by volume). The active fractions (7 liters) are combined, neutralized to pH 7 with N-sodium hydroxide solution and concentrated to 140 cc. under reduced pressure at a temperature below 40°C. The concentrate is dialyzed for 24 hours against 4 × 10 liters of distilled water, and 1 volume of n-propanol is then added. The antibiotic is precipitated by adding 10 volumes of acetone. After isolation and drying, there are obtained 23.5 g. of the antibiotic in the form of its Na-salt containing 42,400 u/mg.

EXAMPLE 9

Twenty-two g. of the antibiotic obtained as described in Example 8 are dissolved in 110 cc. of water. The solution is mixed with 110 cc. of n-propanol and the mixture percolated through a column containing 100 cc. of alumina previously washed at pH 4. The development and the elution are performed with n-propanol+water (50:50 by volume).

The active fractions are collected (430 cc.) and concentrated to 100 cc. under reduced pressure at a temperature below 40°C. The concentrate is dialyzed overnight against 10 liters of distilled water. The dialysate is mixed with 1 volume of n-propanol and the active principle precipitated with 10 volumes of acetone. In this manner there are obtained 12 g. of purified antibiotic in the form of its sodium salt, containing 44,000 u/mg. and displaying the following characteristics:

C = 45.0%, H = 7.4%, O = 37.6% (by difference), N = 3.72%, P = 2.16%, Na = 4.15%.

Optical rotation $[\alpha]_D^{22} = +6°\pm1°$ ($c = 0.6$ water)

Ultraviolet spectrum: end absorption 220 m$\mu$($E_1^{1\%}{}_{cm} = 30$) 257 m$\mu$ ($E_1^{1\%}{}_{cm} = 3.5$)

The present invention includes within its scope pharmaceutical compositions containing 11,837 R.P. as such or as a non-toxic salt thereof, in conjunction with a compatible pharmaceutically acceptable carrier, which may itself by physiologically active. Such compositions may be in any pharmaceutical form suitable for the route of administration envisaged, and will ordinarily contain 5 to 95 percent by weight of the antibiotic compound.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating.

The antibiotic may also be put up for clinical use as sterile solid, which can be dissolved in sterile water or some other sterile injectable medium immediately before use.

The proportion of active principle contained in the above-mentioned preparations may vary to suit the desired therapeutic effect. For treatment of infections by Gram-positive bacteria by intramuscular or intravenous administration, the dose varies in general from 0.25 to 1.5 g. for adults. This dose may be repeated either days later if the need should arise.

The following Example illustrates a pharmaceutical composition in accordance with the invention.

EXAMPLE 10

A solution is prepared which contains 50 g. of the sodium salt of 11,837 R.P. in distilled water to make 500 cc. This solution is sterilized by filtration through a bacteriostatic filter and then charged into ampoules (5 cc. per ampoule). The solution in the ampoules is then freeze-dried and the ampoules are sealed. For parenteral administration, the contents of the ampoules are dissolved immediately before use in 5 cc. of distilled water to make an injectable solution. In this manner, there are obtained about 5 cc. of solution containing 0.5 g. of the antibiotic.

WE CLAIM:

1. The antibiotic 11,837 R.P. which is an acid of pKa = 4.1 having a neutralization equivalent of about 600, very readily soluble in water, soluble in methanol, pyridine, acetic acid and dimethylformamide, and sparingly soluble to insoluble in ethanol, acetone, chloroform, and n-hexane, which decomposes without melting above 160°C. and has the approximate elementary analysis C = 46.9%, H = 7.9%, O = 39.2%, N = 3.9% and P = 2.25%, which in its infra-red spectrum, measured on a tablet of a mixture with KBr, shows the following maxima: 3360 very strong, 2930 strong, 1720 strong, 1630 very strong, 1564 medium, 1550 strong, 1430 shoulder, 1400 shoulder, 1380 strong, 1330 medium, 1222 strong, 1164 medium, 1125 shoulder, 1100 medium, 1068 very strong, 1040 very strong, 968 medium, 950 medium, 890 weak, 860 weak and 800 weak, or the salts of the said antibiotic with bases.

2. An alkali metal salt of the antibiotic 11,837 R.P. of claim 1.

3. The sodium salt of 11,837 R.P. which has an optical rotation of $[\alpha]_D^{22} = +6° \pm 1°$, c = 0.6, water, which has the elementary analysis C = 45.0%, H = 7.4%, O = 37.6%, N = 3.72%, P = 2.16% and Na = 4.15%, which in its ultra-violet spectrum, measured on a 0.003 percent solution in water, shows end absorption at 220 m$\mu$ ($E_1{}_{cm}^{1\%} = 30$) and 257 m$\mu$ ($E_1{}_{cm}^{1\%} = 3.5$), and which in its infra-red spectrum, measured on a tablet of a mixture with KBr, shows the following maxima: 3400 very strong, 2910 strong, 1730 very strong, 1547 medium, 1525 strong, about 1430 shoulder, 1378 strong, 1330 medium, 1238 medium, 1160 medium, 1100 medium, 1062 very strong, 1042 shoulder, 1030 shoulder, 972 medium, 947 medium, 890 weak, and 860 weak.

4. Process for the production of the antibiotic 11,837 R.P. as defined in claim 1 which comprises aerobically cultivating *Streptomyces viridans* DS 9466 (NRRL 3087) on an aqueous nutrient medium containing assimilable sources of carbon, nitrogen and inorganic substances, and separating the 11,837 R.P. formed during the cultivation.

5. Process according to claim 4, wherein the culture is effected under submerged aerobic culture conditions at a pH between 6.0 and 7.8 and at a temperature from 23° to 35°C. with an aeration rate of 0.3 to 2 liters of air per liter of medium per minute for from 4 to 7 days.

6. Process according to claim 5, wherein the pH of the nutrient medium at the beginning of the culture is between 6.5 and 7.5.

7. Process according to claim 5, wherein the temperature of the culture is 25° to 28°C.

8. Process according to claim 5, wherein the 11,837 R.P. is separated from the culture medium by adjusting the pH of the medium to below 5, filtering and extracting the filter cake with water containing a lower alcohol at a pH of 3 to 7.

9. Process according to claim 5, wherein the 11,837 R.P. is separated from the culture medium by adjusting the pH of the medium to below 5, filtering and extracting the filter cake with a mixture of lower alcohols.

10. Process according to claim 5, wherein the 11,837 R.P. is separated from the culture medium by adjusting the pH of the medium to about 7 and absorbing the antibiotic on to a strongly basic anion exchange resin from which it is eluted with an aqueous alcoholic solution containing an electrolyte.

11. Process according to claim 8, wherein the crude antibiotic is purified by chromatography on a strongly basic anion exchange resin.

12. Process according to claim 9, wherein the crude antibiotic is purified by chromatography on a strongly basic anion exchange resin.

13. Process according to claim 10, wherein the crude antibiotic is purified by chromatography on a strongly basic anion exchange resin.

14. Process according to claim 11, wherein the partially purified antibiotic obtained is further purified by dialysis of an aqueous solution thereof.

15. Process according to claim 12, wherein the plurality purified antibiotic obtained is further purified by dialysis of an aqueous solution thereof.

16. Process according to claim 13, wherein the partially purified antibiotic obtained is further purified by dialysis of an aqueous solution thereof.

17. A pharmaceutical composition comprising, in association with a compatible pharmaceutically acceptable carrier, 5 to 95 percent by weight of an antibiotic compound selected from the class consisting of the antibiotic 11,837 R.P. which is an acid of pKa = 4.1 having a neutralization equivalent of about 600, very readily soluble in water, soluble in methanol, pyridine, acetic acid and dimethylformamide, and sparingly soluble to insoluble in ethanol, acetone, chloroform, and n-hexane, which decomposes without melting above 160°C. and has the approximate elementary analysis C = 46.9 percent, H = 7.9 percent, O = 39.2 percent, N = 3.9 percent and P = 2.25 percent, which in its infra-red spectrum, measured on a tablet of a mixture with KBr, shows the following maxima: 3360 very strong, 2930 strong, 1720 strong, 1630 very strong, 1564 medium, 1550 strong, 1430 shoulder, 1400 shoulder, 1380 strong, 1330 medium, 1222 strong, 1164 medium, 1125 shoulder, 1100 medium, 1068 very strong, 1040 very strong, 968 medium, 950 medium, 890 weak, 860 weak and 800 weak, and the salts of the said antibiotic with non-toxic bases.

18. A pharmaceutical composition as claimed in claim 17 in the form of a sterile injectable solution.

* * * * *